United States Patent Office 2,971,908
Patented Feb. 14, 1961

2,971,908

PROCESS FOR REINFORCING POLYTETRA-FLUOROETHYLENE RESIN

Frank Richard Chaffin, Los Angeles, Calif., assignor to W. S. Shamban & Co., Culver City, Calif., a corporation No Drawing. Filed Aug. 15, 1957, Ser. No. 678,433

2 Claims. (Cl. 252—12)

The invention relates to filled or reinforced resin material and more particularly to a reinforced polytetrafluoroethylene resin and to a process for fabricating the same.

The use of polytetrafluoroethylene resin has become widespread in recent years, and this resin is usually identified as "Teflon" which is a registered trademark of the E. I. du Pont Company of Wilmington, Delaware.

Teflon has been found to have improved electrical, chemical, temperature and friction characteristics as compared with other materials of this general type. Components fabricated from Teflon may be used successfully through a temperature range of the order of —450° Fahrenheit to +500° Fahrenheit. These components are relatively tough and rigid, and yet they are capable of exhibiting some degree of flexibility. The coefficient of friction and the abrasive characteristics exhibited by the surfaces of the components are extremely low. This latter factor enables the components to be used satisfactorily as self-lubricating bearing elements. The components are almost completely resistant to attack by most known chemicals. They also exhibit substantially constant low-loss electrical characteristics through a wide range of frequencies and temperatures.

Because of the above characteristics, Teflon is widely used in electrical and electronic industries for electrical insulation at high frequencies and temperatures. Teflon is also utilized in the chemical industry for gasketing and packing, and it also is extensively used for such other applications as hydraulic sealing components, back-up sealing cups, O-rings, bearings, piston rings, and other miscellaneous components.

The limitation in the use of Teflon has resulted from its susceptibility to "cold flow" under compressive loads, and its resulting lack of form stability under these conditions. This tendency for the material to yield under compressive loads has been alleviated in the past by the use of a filler in the Teflon resin. Fiberglas and similar materials have been suggested in the prior art as constituting an appropriate filler for this purpose.

However, filler-reinforced Teflon in the past has exhibited higher coefficients of friction and surface abrasiveness than the pure Teflon. This has limited the use of reinforced Teflon, and has rendered the material unsatisfactory for use in high compressive applications when it is also required that the material exhibit a good self-lubricated bearing surface. For example, the prior art forms of reinforced Teflon are unsuitable for use as rubbing or bearing surfaces in applications such as back-up rings in hydraulic systems, journal bearings and the like.

The present invention provides for the use of boron nitride (BN) as a filler to build up the resistance of Teflon to distortion under compressive loads. It has been found that the use of boron nitride not only builds up the resistance to a substantial extent, but actually decreases the surface coefficient of friction and abrasiveness of the material. The resulting material, therefore, is ideally suited for use in a compressive loading situation and where a self-lubricating bearing surface is also required.

In a particular example of the process of the invention, relatively pure polytetrafluoroethylene resin is ground at a reduced temperature of, for example, from —250° F. to —300° F., the grinding being carried out in a liquefied inert gas such as nitrogen. A quantity of boron nitride (BN) is also ground in the liquefied nitrogen at this reduced temperature, and the resulting powders are intimately mixed together. It should be stressed that no chemical reaction results in the process, and that the boron nitride acts only as a filler for the tetrafluoroethylene.

In the specific example, the boron nitride proportion to the polytetrafluoroethylene was 15% by weight. However, it has been found that the actual proportions are not critical. Satisfactory results have been obtained, for example, when the proportions between the boron nitride and the polytetrafluoroethylene were within the range of essentially 5%–25% by weight.

Boron nitride is a self-lubricating ceramic material, and as such is somewhat fragile and brittle. It is evident that as the percentage of boron nitride is increased with respect to the trifluoroethylene, the brittleness of the resulting material likewise increases. On the other hand, as the percentage of the boron nitride is decreased, the resulting material exhibits characteristics approaching those of the pure polytetrafluoroethylene. This means that the proportion of the boron nitride in the polytetrafluoroethylene is not fixed, but can be tailored to meet the specific requirements of the particular application for which the material is required.

The following table demonstrates the comparative properties of boron nitride filled Teflon as compared with one particular type of pure Teflon.

| | Pure Teflon | Boron Nitride filled Teflon, 15% by wt. |
|---|---|---|
| Specific Gravity | 2.15 | 2.11 |
| Coefficient of Friction on Polished Steel: | | |
| (a) Static or Kinetic | 0.04 | 0.033 |
| (b) Dynamic | 0.016 | 0.013 |
| Tensile Strength (p.s.i.) | 2,500 | 1,500 |
| Elongation (Percent) | 222 | 43 |
| Deformation at 1,000 p.s.i. and 400° F. for 7 minutes (percent) | 21.4 | 5.2 |

It will be seen that the static and kinetic coefficient of friction of pure Teflon is reduced by a factor of .809 by the addition of the 15% boron nitride filler by weight. This is the coefficient of friction exhibited by the surface of the component when it is first moved with respect to a rubbing surface. A like reduction in the surface coefficient of friction was exhibited by the boron nitride filled Teflon under dynamic conditions.

Although the tensile strength of the boron nitride filled Teflon is somewhat lower than that of the pure resin, it is still appreciable so that components constructed of the filled material are suitable even for many applications requiring a relatively high tensile strength.

In like manner, the elongation factor of the filled material is lower than that of the pure resin. This latter factor is the percentage of its length that a component can be stretched before it will break. This reduction in elongation of the boron nitride filled Teflon limits its use to some extent to compressive applications rather than those to which relatively high tension forces are applied to the material.

An important feature of the described process is the tremendous reduction in the deformation factor of the boron nitride filled Teflon as compared with pure Teflon.

This factor represents the percentage permanent deformation suffered by the component after a specified load has been applied to it for a specified time and at a specified temperature. It will be noted that the boron nitride filled Teflon exhibited a deformation factor of the order of one-quarter that of the pure resin.

None of the electrical insulating characteristics, heat or chemical resistant characteristics, or other characteristics of the polytetrafluoroethylene material were found to suffer to any noticeable extent by the introduction of the reinforcing boron nitride filler.

The described process provides, therefore, an improved means by which pure polytetrafluoroethylene resin can be adapted to exhibit improved compressive yield characteristics, and at the same time, and contrary to prior art reinforcers, to exhibit a reduced surface coefficient of friction and abrasiveness. The process results in a substance of extremely low coefficient of friction and relatively high compressive yield strength. The substance also exhibits a higher thermal conductivity with pure polytetrafluoroethylene.

Teflon can also be formed into various shapes by extruding it in dry powder form, this extrusion being accompanied or followed by raising the material to a sintering temperature. This process has several limitations and it is not suitable for many purposes, such as for the formation of thin walled tubing. For thin walled Teflon tubing and the like, a process known as "paste extrusion" has been developed.

The fact that Teflon does not melt or flow, and because it cannot be dissolved, has limited the processing and forming methods which are suitable for fabricating Teflon parts. Also, because of these properties, the processing and forming techniques usually used with most other plastics are not suitable for Teflon.

In the prior art extrusion process, Teflon is usually mixed in its finely divided state with a volatile organic lubricant. The mixture is then extruded and heated to volatize the lubricant and to produce the desired sintering of the material.

A specific Teflon composition for paste-extrusion has been prepared in the following manner. A volatile lubricant was made up by dissolving one part by weight "Vistanex" (LM-MS grade), a polyisobutylene product of the Enjay Company of New Jersey; in sixteen parts by weight of VMP grade naphtha. This lubricant was added to finely divided Teflon (Du Pont TE-3086 grade) in the proportion of about 1:5 by weight.

The ingredients were then thoroughly mixed by tumbling in a partly filled closed container. The resulting moistened powder was then pressed into preforms at room temperature and under a pressure of from 10 to 50 p.s.i. The preforms were then inserted into a ram type extruder to produce thin-wall tubing or other desired configurations. The resulting unfinished extruded article was soft and fragile. It was then cured by heating it around 300° F. to drive off the volatile substances. Finally, the article was raised to a sintering temperature of about 620° F. to produce a tough fibrous body.

Certain difficulties have been encountered in the paste-extrusion process. First, the length of a flawless article that can be obtained by this process is limited to a single preform. This is because the charge from a second preform will not bond with the compressed remaining portion of the preceding preform. Then, when the material at the junction of the two preforms reaches the extruding orifices, defects and flaws occur at that junction. These defects become apparent immediately or during the subsequent sintering step.

It is not completely understood just why successive preforms will not unite in the extruding process. It is believed, however, that the forcing out of the lubricant is a major factor in producing this condition. Teflon is not soluble in the lubricant so that the latter apparently congregates in localized areas under the pressures that occur during the extrusion step. Then, when the lubricant is volatized off, a space is left in the Teflon which creates flaws in the material.

It has been suggested in the past that the flaws and defects discussed in the preceding paragraph may be eliminated by the addition of carbon black to the Teflon-lubricant paste. The addition of this material has been found to allow continuous lengths of extruded material to be produced from a plurality of preforms without substantial defects at the junction areas.

It appears that an inert material, such as carbon black, capable of absorbing the lubricant, is effective to bring about a better distribution of the lubricant in the composition and to maintain such an improved distribution even under the conditions of the increased pressure that arises during the extrusion process. However, the use of carbon black can adversely affect certain of the properties of the finished product. For example, the electrical insulating characteristics of the product are impaired to a large extent by this use.

The application of boron nitride to the Teflon-lubricant paste so as to assist in the extrusion process constitutes another aspect of the improved process and method of the invention. When even minute portions of boron nitride are added, it has been found that successive preforms can be used in the extrusion process without any tendency for the flaws described above to arise in the formed components. This desirable condition is achieved, moreover, without any deterioration in the electrical insulating or other properties of the formed components. Also, when the proportion of the boron nitride in the Teflon-lubricant paste is increased to a more material percentage, the formed components have the additional feature of exhibiting the improved characteristics described in detail previously in the present specification.

A specific example, with respect to the addition of boron nitride with the extrusion paste is as follows.

The following composition may be used, for example:

|  | Grams |
| --- | --- |
| Teflon (TE 3086) | 810 |
| Boron nitride | 0.81 |
| Naphtha-Vistanex solution | 190 |

The stated weight of Teflon powder is placed in a closed container, and the proper weight of boron nitride in powdered form is added to it. The container is then tumbled until the two ingredients are thoroughly mixed. The naphtha-Vistanex solution is then added, and the tumbling is resumed for about two minutes. The moist mixture may then be screened through a ⅛ mesh screen to break up the lumps. It is then replaced in the container for further tumbling. The mixture is, preferably, stored for about sixteen hours at room temperature before use. Preforms may then be made of the material under pressures of from 10 to 50 p.s.i. When such preforms are extruded in a typical ram-type extruder, they may be bonded to one another without any defects or flaws at the junction points.

It has been found that less than 0.1% nitride in the Teflon-lubricant paste provides improved results in the extrusion process. In fact, improvements are noticeable with as little as .01% addition of the boron nitride. Also, when larger percentages up to, for example, 5%, are used, as noted above, the extruded components exhibit the additional favorable properties described previously in this specification.

Although the now preferred embodiment of the present invention has been shown and described herein, it is to be understood that the invention is not to be limited thereto, for it is susceptible to changes in form and detail within the scope of the appended claims.

I claim:

1. A process for forming a composition of matter which includes polytetrafluoroethylene resin and a filler of boron nitride, the process comprising, grinding a selected quantity of polytetrafluoroethylene resin and a proportionate quantity of 5%–25% by weight of boron nitride to a powder at a reduced temperature of the order of —250 degrees Fahrenheit in a liquefied inert gas and intimately intermixing the same, and permitting the resulting mixture to rise to room temperature.

2. A process for forming a composition of matter which includes polytetrafluoroethylene resin and a filler of boron nitride which comprises, grinding a selected quantity of polytetrafluoroethylene resin and a proportionate quantity of 5%–25% by weight of boron nitride to a powder at a reduced temperature of —250° F. to —300° F. in liquid nitrogen and intimately intermixing the polytetrafluoroethylene resin and the boron nitride, and permitting the resulting mixture to rise to room temperature.

References Cited in the file of this patent

UNITED STATES PATENTS

| | | |
|---|---|---|
| 2,752,321 | Heller | June 26, 1956 |
| 2,788,324 | Mitchell | Apr. 9, 1957 |